(12) United States Patent
Takii et al.

(10) Patent No.: US 6,307,606 B1
(45) Date of Patent: Oct. 23, 2001

(54) COLOR FILTER FOR USE IN DISPLAY APPARATUS

(75) Inventors: Kenji Takii; Takaharu Yamada; Koji Matsuoka, all of Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/589,456

(22) Filed: Jun. 8, 2000

(30) Foreign Application Priority Data

Jun. 10, 1999 (JP) .................................................. 11-164499

(51) Int. Cl.[7] .......................... G02F 1/1335; G02F 1/136
(52) U.S. Cl. .............................. 349/106; 349/108; 349/42
(58) Field of Search .................................... 349/106, 107, 349/108, 109, 42; 345/88

(56) References Cited

U.S. PATENT DOCUMENTS

| | | | | |
|---|---|---|---|---|
| 4,716,403 | * | 12/1987 | Morozumi | 345/88 |
| 4,781,438 | * | 11/1988 | Noguchi | 349/54 |
| 4,986,637 | * | 1/1991 | Yamaguchi | 350/339 F |
| 5,822,026 | * | 10/1998 | Matsuo | 349/38 |

FOREIGN PATENT DOCUMENTS

| | | |
|---|---|---|
| 10-62768 A | 3/1998 | (JP) . |
| 2000-249823 A | 9/2000 | (JP) . |

| | | |
|---|---|---|
| 02-000352939-A* | 12/2000 | (JP) . |

\* cited by examiner

Primary Examiner—William L. Sikes
Assistant Examiner—Tarifur R. Chowdhury
(74) Attorney, Agent, or Firm—Nixon & Vanderhye, P.C.

(57) ABSTRACT

A liquid crystal display apparatus including: a first substrate a plurality of pixel electrodes each provided adjacent to a corresponding one of the intersections of the plurality of signal lines and the plurality of scan lines; a second substrate having a first colored region including a plurality of colors, the first colored region corresponding to the plurality of pixel electrodes; and a liquid crystal layer being interposed between the first substrate and the second substrate. The apparatus further includes a second colored region provided in at least a portion of a periphery of the first colored region, the second colored region including the plurality of colors, wherein at least one of the plurality of signal lines is bent within a region overlapping the second colored region; the second colored region at least includes a plurality of first color layer segments which are colored in a first color, and a plurality of second color layer segments which are colored in a second color; and the plurality of first color layer segments are arranged so that a portion of the at least one signal line which overlaps the plurality of first color layer segments has a length greater than a length of a portion of the at least one signal line which overlaps the plurality of color layer segments other than the plurality of first color layer segments in the second colored region.

24 Claims, 14 Drawing Sheets

CF peripheral region

CF display region

COLOR FILTER FOR USE IN DISPLAY APPARATUS

BACKGROUND OF THE INVENTION

1. Field of the Invention

The present invention relates to a display apparatus used in, for example, a television set, a personal computer, a word processor, office automation equipment, or the like, and more specifically, to a display apparatus incorporating a color filter substrate which can provide improved display quality.

2. Description of the Related Art

A liquid crystal display (hereinafter referred to as "LCD") apparatus is an exemplary display apparatus which adjusts the amount of transmitted light through an optical display medium in order to display images.

Conventionally, an LCD apparatus structure for displaying color images is known in which a color filter (hereinafter referred to as "CF") substrate is employed as one of a pair of substrates opposing each other with a liquid crystal layer interposed therebetween. This CF substrate includes color layer segments of red (R), green (G), and blue (B) on a transparent support, where the color layer segments may be arranged in stripes, dot patterns, etc., that correspond to the respective display pixels. A resin having an excellent transparency (e.g., an acrylic resin) may additionally be applied over such patterns of R, G, and B segments to provide a coating layer.

Moreover, for the purpose of providing improved contrast and/or display quality, a black mask (which may often be referred to as a "black matrix") is placed in a frame region (a peripheral region) which defines the circumference of a display region of the CF substrate, and/or in gaps between the pixels. The black mask, which may be formed by patterning a black paste layer or a black metal layer, is expected to exhibit a black state equivalent to a black display state.

For such a CF substrate, it has been desired to eliminate the production steps required for the black mask in order to lower the overall manufacturing cost. For example, the following methods are known to accomplish this: a method of alternately overlaying color layer segments of R and B (or R, G, and B) upon one another, these colors being selected to correspond to the respective colors of the color layer segments (R, G, and B) used in the display region so that they together exhibit a black state; and a method of employing a two-dimensional arrangement of color layer segments of R, G, and B where the color layer segments are provided with predetermined ratios so as to collectively exhibit a black state.

However, the latter method may generate moire fringes in the peripheral region. Specifically, when a CF substrate is adhered to an active matrix (hereinafter referred to as "AM") substrate, the color layer segments of the CF filter substrate may overlap a section of the AM substrate which is formed of a plurality of lead wires (e.g., gate lines (scan lines) and source lines (signal lines)), such section typically having a different reflectance from that of the surrounding glass substrate. etc. In such cases, moire fringes may be observed if the colors of the color layer segments in the "black mask" region vary In a cycle of more than about 100 µm. This would result in the degradation of the display quality of the LCD apparatus.

In order to solve the aforementioned problem, Japanese Laid-open Publication No. 10-62768 discloses an LCD including a second light shielding section which covers a portion extending over two or more gate lines and/or over two or more source lines on an AM substrate. This arrangement ensures that the lead wire patterns will not be visually recognized, thereby improving the display quality. In addition, it is also disclosed that the second light shielding section can be formed of the same material as that of the gate and source lines so that the second light shielding section can be patterned simultaneously with the gate and source lines, thereby simplifying the production process.

In the conventional CF substrate described above, there is no predefined relationship between the arrangements of the gate/source lines on the AM substrate and the colors of the color layer segments on the CF substrate. Therefore, moire fringes may be generated in an extensional section (i.e., a section extending outside the display region) of lead wires in the frame region, thereby degrading the quality of the color display.

The technique disclosed In Japanese Laid-open Publication No. 10-62768, supra, requires additional steps for forming a second light shielding section, thereby increasing the number of steps performed during the production process. In the case where a second light shielding section is formed of the same material as that of the gate and source lines and the second light shielding section are patterned simultaneously with the gate and source lines in order to simplify the production process, some delay may possibly occur in the signal lines. Such delay may not be tolerated in certain applications.

SUMMARY OF THE INVENTION

According to one aspect of the present invention, there is provided a liquid crystal display apparatus including: a first substrate on which a plurality of signal lines and a plurality of scan lines are provided so as to appear to intersect each other at intersections; a plurality of pixel electrodes each provided adjacent to a corresponding one of the intersections of the plurality of signal lines and the plurality of scan lines; a second substrate having a first colored region including a plurality of colors, the first colored region corresponding to the plurality of pixel electrodes; and a liquid crystal layer being interposed between the first substrate and the second substrate. The apparatus further includes a second colored region provided in at least a portion of a periphery of the first colored region, the second colored region including the plurality of colors. In this apparatus, at least one of the plurality of signal lines is bent within a region overlapping the second colored region; the second colored region at least includes a plurality of first color layer segments which are colored in a first color, and a plurality of second color layer segments which are colored in a second color; and the plurality of first color layer segments are arranged so that a portion of the at least one signal line which overlaps the plurality of first color layer segments has a length greater than a length of a portion of the at least one signal line which overlaps the plurality of color layer segments other than the plurality of first color layer segments in the second colored region.

In one embodiment of the present invention, the liquid crystal display apparatus further includes a third colored region provided in at least a portion of the periphery of the first colored region, the third colored region including the plurality of colors. In this apparatus, at least one of the plurality of scan lines is bent within a region overlapping the third colored region; the third colored region at least includes a plurality of third color layer segments which are colored in a third color, and a plurality of fourth color layer segments which are colored in a fourth color; and the plurality of third color layer segments are arranged so that a portion of the at least one scan line which overlaps the plurality of third color layer segments has a length greater than a length of a portion of the at least one scan line which overlaps the plurality of color layer segments other than the plurality of third color layer segments in the third colored region.

In another embodiment of the present invention, the plurality of first color layer segments are colored in a color having the least luminosity factor among the plurality of colors.

In still another embodiment of the present invention, the plurality of third color layer segments are colored in a color having the least luminosity factor among the plurality of colors.

In still another embodiment of the present invention, the plurality of color layer segments included in the second colored region are arrayed in a strips, delta, mosaic, or random arrangement, or in a combination thereof.

In still another embodiment of the present invention, the plurality of color layer segments included in the third colored region are arrayed in a stripe, delta, mosaic, or random arrangement, or in a combination thereof.

In still another embodiment of the present invention, a fifth color layer segment is provided in at least a portion of the second colored region, the fifth color layer segment being colored in a color having the least luminosity factor among the plurality of colors, and the fifth color layer segment has a width of about 1 mm or less along a longitudinal direction of the plurality of the signal lines.

In still another embodiment of the present invention, a sixth color layer segment is provided in at least a portion of the third colored region, the sixth color layer segment being colored in a color having the least luminosity factor among the plurality of colors, and the sixth color layer segment has a width of about 1 mm or less along a longitudinal direction of the plurality of the scan lines.

In still another embodiment of the present invention, a seventh color layer segment is provided in at least a portion of the second colored region, the seventh color layer segment being colored in a color occupying a largest portion among the plurality of colors, and the seventh color layer segment has a width of about 1 mm or less along a longitudinal direction of the plurality of the signal lines.

In still another embodiment of the present invention, an eighth color layer segment is provided in at least a portion of the third colored region, the eighth color layer segment being colored in a color occupying a largest portion among the plurality of colors, and the eighth color layer segment has a width of about 1 mm or less along a longitudinal direction of the plurality of the scan lines.

According to another aspect of the present invention, there is provided a liquid crystal display apparatus including: a first substrate on which a plurality of signal lines and a plurality of scan lines are provided so as to appear to intersect each other at intersections; a plurality of pixel electrodes each provided adjacent to a corresponding one of the intersections of the plurality of signal lines and the plurality of scan lines; a second substrate having a first colored region including a plurality of colors, the first colored region corresponding to the plurality of pixel electrodes; and a liquid crystal layer being interposed between the first substrate and the second substrate. The apparatus further includes a second colored region provided in at least a portion of a periphery of the first colored region, the second colored region including the plurality of colors. In this apparatus, at least one of the plurality of scan lines is bent within a region overlapping the second colored region; the second colored region at least includes a plurality of first color layer segments which are colored in a first color, and a plurality of second color layer segments which are colored in a second color; and the plurality of first color layer segments are arranged so that a portion of the at least one scan line which overlaps the plurality of first color layer segments has a length greater than a length of a portion of the at least one scan line which overlaps the plurality of color layer segments other than the plurality of first color layer segments in the second colored region.

In one embodiment of the present invention, the plurality of first color layer segments are colored in a color having the least luminosity factor among the plurality of colors.

In another embodiment of the present invention, the plurality of color layer segments included in the second colored region are arrayed in a stripe, delta, mosaic, or random arrangement, or in a combination thereof.

In still another embodiment of the present invention, a third color layer segment is provided in at least a portion of the second colored region, the third color layer segment being colored in a color having the least luminosity factor among the plurality of colors, and the third color layer segment has a width of about 1 mm or less along a longitudinal direction of the plurality of the scan lines.

In still another embodiment of the present invention, a fourth color layer segment is provided in at least a portion of the second colored region, the fourth color layer segment being colored in a color occupying a largest portion among the plurality of colors, and the fourth color layer segment has a width of about 1 mm or less along a longitudinal direction of the plurality of the scan lines.

According to still another aspect of the present invention, there is provided a liquid crystal display apparatus including: a first substrate on which a plurality of signal lines and a plurality of scan lines are provided so as to appear to intersect each other at intersections; a plurality of pixel electrodes each provided adjacent to a corresponding one of the intersections of the plurality of signal lines and the plurality of scan lines; a second substrate having a first colored region including a plurality of colors, the first colored region corresponding to the plurality of pixel electrodes; and a liquid crystal layer being interposed between the first substrate and the second substrate. The apparatus further includes a second colored region provided in at least a portion of a periphery of the first colored region, the second colored region including the plurality of colors. In this apparatus, at least one of the plurality of signal lines is bent within a region overlapping the second colored region; the second colored region at least includes a plurality of first color layer segments which are colored in a first color, and a plurality of second color layer segments which are colored in a second color; and the plurality of first and second color layer segments each have a width of about 150 $\mu$m or less along a longitudinal direction of the plurality of signal lines.

In one embodiment of the present invention, the liquid crystal display apparatus further includes a third colored region provided in at least a portion of the periphery of the first colored region, the third colored region including the plurality of colors. In this apparatus, at least one of the plurality of scan lines is bent within a region overlapping the third colored region; the third colored region at least includes a plurality of third color layer segments which are colored in a third color, and a plurality of fourth color layer segments which are colored in a fourth color; and the plurality of third and fourth color layer segments each have a width of about 150 μm or less along a longitudinal direction of the plurality of scan lines.

In another embodiment of the present invention, the plurality of first and second color layer segments each have a width of about 100 μm or less along the longitudinal direction of the plurality of signal lines.

In still another embodiment of the present invention, the plurality of third and fourth color layer segments each have a width of about 100 μm or less along a longitudinal direction of the plurality of scan lines.

In still another embodiment of the present invention, the plurality of color layer segments included in the second colored region are arrayed in a stripe, delta, mosaic, or random arrangement, or in a combination thereof.

In still another embodiment of the present invention, the plurality of color layer segments included in the third colored region are arrayed in a stripe, delta, mosaic, or random arrangement, or in a combination thereof.

According to another aspect of the present invention, there is provided a liquid crystal display apparatus including: a first substrate on which a plurality of signal lines and a plurality of scan lines are provided so as to appear to intersect each other at intersections; a plurality of pixel electrodes each provided adjacent to a corresponding one of the intersections of the plurality of signal lines and the plurality of scan lines; a second substrate having a first colored region including a plurality of colors, the first colored region corresponding to the plurality of pixel electrodes; and a liquid crystal layer being interposed between the first substrate and the second substrate. The apparatus further includes a second colored region provided in at least a portion of a periphery of the first colored region, the second colored region including the plurality of colors. In this apparatus, at least one of the plurality of scan lines is bent within a region overlapping the second colored region; the second colored region at least includes a plurality of first color layer segments which are colored in a first color, and a plurality of second color layer segments which are colored in a second color; and the plurality of first and second color layer segments each have a width of about 150 μm or loss along a longitudinal direction of the plurality of scan lines.

In one embodiment of the present invention, the plurality of first and second color layer segments each have a width of about 100 μm or less along the longitudinal direction of the plurality of scan lines.

In another embodiment of the present invention, the plurality of color layer segments included in the second colored region are arrayed in a stripe, delta, mosaic, or random arrangement, or in a combination thereof.

The function of the present invention will now be described.

According to the present invention, a single layer of color layer segments are provided in a peripheral region, the color layer segments having at least two colors selected from among the colors of the color layer segments in a display region. The color layer segments are disposed in a predetermined arrangement such as a stripe, delta, mosaic, or random arrangement, or a combination of these arrangements may be used. The color layer segments are disposed with a predetermined area ratio which is selected independently of the area ratio of the color layer segments in the display region. This makes it possible, without employing a black mask, to obtain a display state in the peripheral region which is substantially similar to a black display state.

According to the present invention, color layer segments of the same color are arranged so as to overlap at least portions of respective lead wires (i.e., extensional sections of the lead wires or portions thereof), where the pitch of these color layer segments is matched to that of the lead wires in the peripheral region. With such an arrangement, moire fringes are substantially prevented from being recognized, as will be explained in connection with the following examples. Moreover, moire fringes become even less visible if the color layer segments of a color having the least luminosity factor among a plurality of colors (e.g., B among R, G, and B) are arranged in a manner to overlap the lead wires.

Although the maximum perceivable resolution may vary depending on each viewer, it is expected that moire fringes become least visible when the pitch of the peripheral color layer segments along the wire length direction (i.e., the longitudinal direction of the lead wires) is about 150 μm or less. In particular, the moire fringes become substantially invisible when the pitch of the peripheral color layer segments along the wire length direction is about 100 μm or less, as explained in connection with the following examples.

The aforementioned arrangement in which the pitch of the peripheral color layer segments is set at about 150 μm or less, and preferably about 100 μm or less, may be employed in conjunction with the aforementioned arrangement in which the color layer segments of the same color are arranged in a manner to overlap at least portions of the respective lead wires.

Alternatively, moire fringes can be prevented from being recognized when a section having a width of about 1 mm or less along the wire length direction is provided In a color having the least luminosity factor, or a color occupying the largest portion (in area ratio) of the peripheral region, as explained in Example 6 below.

Thus, the invention described herein makes possible the advantage of providing a display apparatus which requires no black mask in the peripheral region of a CF substrate and therefore reduces the manufacturing cost, and which provides a high-quality displayed image free from moire fringes in the peripheral region.

This and other advantages of the present invention will become apparent to those skilled in the art upon reading and understanding the following detailed description with reference to the accompanying figures.

BRIEF DESCRIPTION OF THE DRAWINGS

FIG. 15 is a plan view illustrating peripheral color layer segments arrayed in a random arrangement.

DESCRIPTION OF THE PREFERRED EMBODIMENTS

Preferred embodiments of the present invention will now be described with reference to the accompanying figures.

Figure 1:
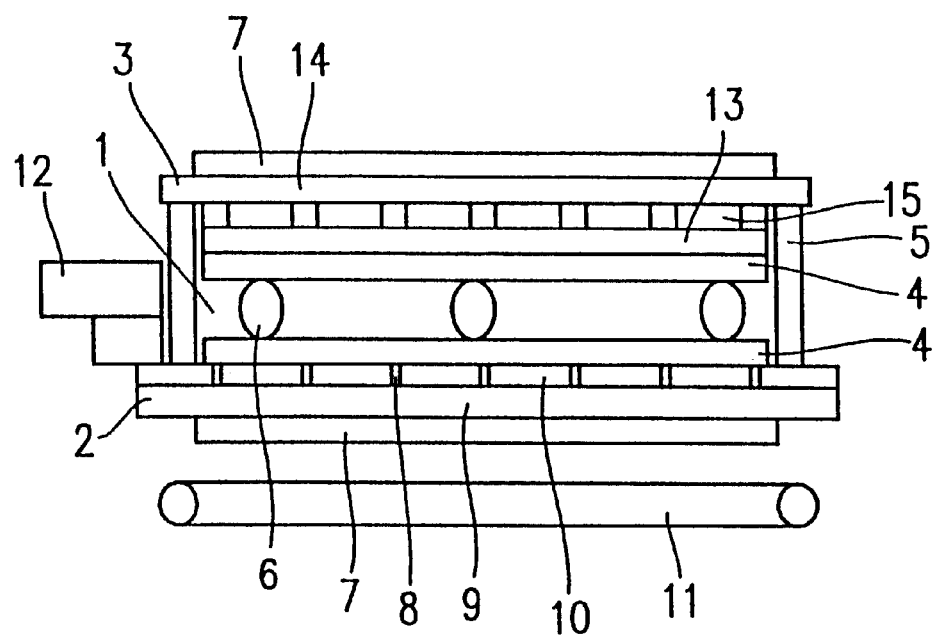
FIG. 1 is a cross-sectional diagram illustrating a schematic structure of an LCD apparatus according to one example of the present invention.

As one embodiment of the present invention, a transmission type color display AM LCD apparatus as shown in FIG. 1 will be illustrated.

This LCD includes a liquid crystal layer 1 (thickness: about 3 $\mu$m to 10 $\mu$m) interposed between an AM substrate 2 and a CF substrate 3. The AM substrate 2 is formed of a glass substrate 9 with transparent pixel electrodes 10 provided thereon. The CF substrate 3 is formed of a glass substrate 14 with a transparent common electrode (counter electrode) 13 provided thereon (not shown). A liquid crystal alignment film 4 is provided on each of the AM substrate 2 and the CF substrate 3 surfaces which face the liquid crystal layer 1.

The periphery of the liquid crystal layer 1 is hermetically sealed with a sealing material 5, thereby defining a cell structure. A gap in the cell structure, which corresponds to the thickness of the liquid crystal layer 1, is controlled on the basis of the diameter of spacers 6 which are added within the liquid crystal layer 1.

Polarizing plates 7 are disposed on the respective outer surfaces of the AM substrate 2 and the CF substrate 3 for transmitting or shielding the light polarized through the liquid crystal layer 1. In the case of a reflection type LCD, one of the polarizing plates 7 may integrally include a light reflection film; alternatively, the pixel electrodes 10 may act as reflection electrodes.

The AM substrate 2 has switching elements 8 placed on the glass substrate 9 in a matrix pattern. The switching elements 8 are connected to the respective transparent pixel electrodes 10. The switching elements 8 and the transparent pixel electrodes 10 are interposed between the glass substrate 9 and the liquid crystal alignment film 4. The switching elements 8 may be a-Si (amorphous silicon) type TFTs (thin film transistors), p-Si (polysilicon) type TFTs, MIM (metal-insulative layer-metal) type TFDs (thin film diode), or the like.

In addition, a backlight 11 is provided adjacent to the back face of the AM substrate 2 to maintain sufficient brightness, and a driving section 12 is provided in the circumference of the display region for driving the switching elements 8.

On the CF substrate 3, the transparent common electrode 13 is interposed between the liquid crystal alignment film 4 and the glass substrate 14. The transparent common electrode 13 acts as a single, unified electrode that opposes and cooperates with all of the transparent pixel electrodes 10 on the AM substrate 2.

The CF substrate 3 also includes a CF 15 having a rectangular shape, which is placed between the transparent common electrode 13 and the glass substrate 14. The CF 15 includes color layer segments 15a of three primary colors, R, G, and B, (see FIG. 6), which define pixels corresponding to the respective transparent pixel electrodes 10. In order to shield light from passing through the gaps between patterns of the color layer segments 15a, each pixel (or each color layer segment) may overlap one another.

The CF 15 and the liquid crystal layer 1 described above are formed so as to provide a display surface area (not shown in the figures) which is greater than the display region in which the transparent pixel electrodes are provided. This prevents any display images that are created in the periphery of the display region from becoming darker than those created in the center of the display region, and thus deterioration of the quality of the display image can be avoided. The CF 15 may be replaced by a CF 115, a CF 215, a CF 315 or a CF 415 as described below.

Figure 2:
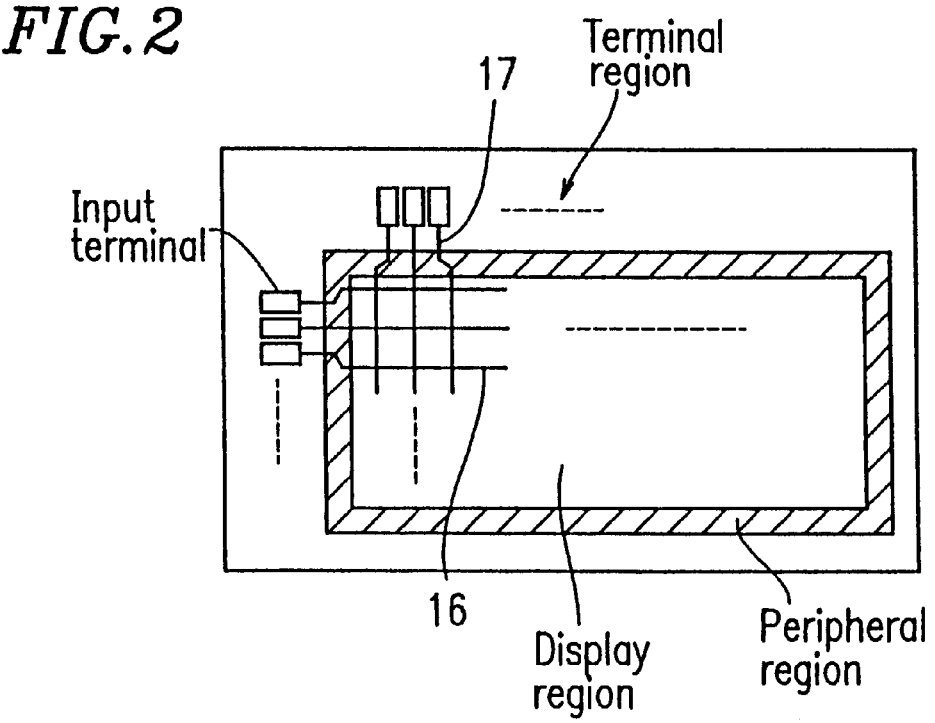
FIG. 2 is a plan view illustrating a schematic structure of the LCD apparatus according to one example of the present invention.

FIG. 2 is a plan view of the above-described LCD.

This LCD includes the AM substrate 2 having the pixel electrodes 10, the CF substrate 3 having the counter electrode 13, and the liquid crystal layer 1 interposed between the substrates 2 and 3. As used herein, the region in which the pixel electrodes 10 are opposed by the counter electrode 13 defines a "display region", whereas the perimeter of the display region defines a "peripheral (frame) region". The AM substrate 2 includes gate signal lines 16 as scan lines and source signal lines 17 as signal lines, which would appear as running in the vicinity of every pixel electrode and intersecting each other when seen in the plan view. Both signal lines 16 and 17 extend beyond the peripheral region so as to be connected to input terminals which are provided in a terminal region lying outside the peripheral region. Scanning voltages are input to the gate signal lines 16, whereas signal voltages are input to the source signal lines 17 via the input terminals. As shown in FIG. 2, all of the source signal lines 17 and the gate signal lines 16 extend into and beyond the peripheral region of the CF. As shown, some of the source signal lines 17 and the gate signal lines 16 are bent within the peripheral region in order to be connected to the respective input terminals.

Figure 3:
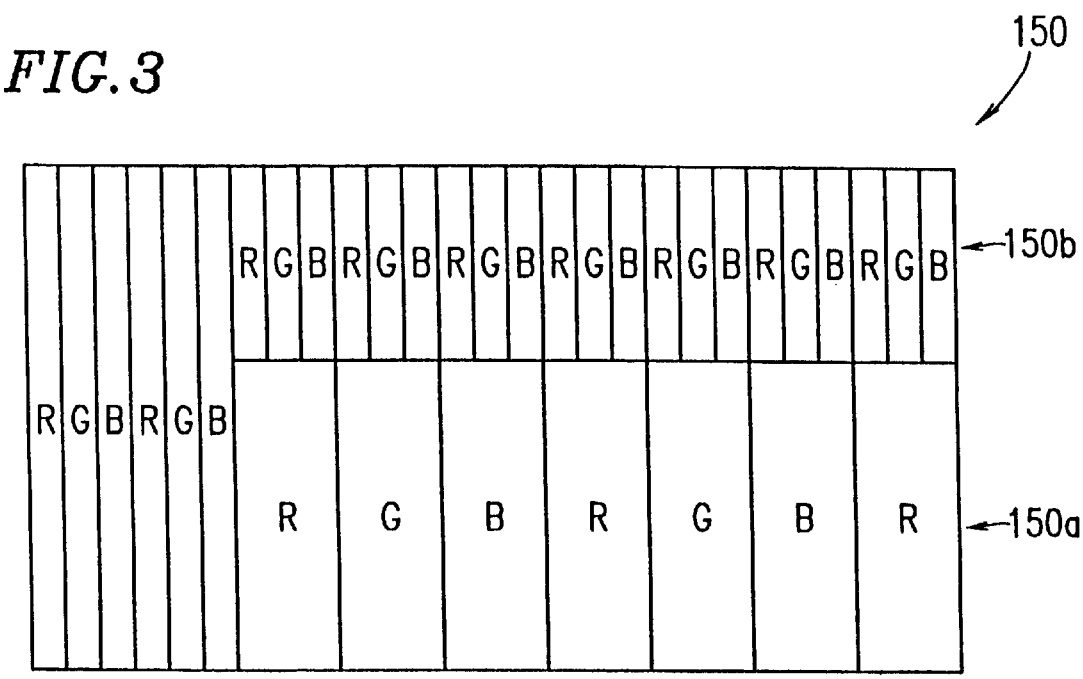
FIG. 3 is a plan view illustrating a main portion of a CF substrate in an LCD apparatus of the related art.

For the purpose of comparison, a CF substrate in the related art will be discussed with reference to FIGS. 3 to 5. Referring to FIG. 3, a conventional CF 150 includes rectangular-shaped color layer segments 150a in a display region and peripheral color layer segments 150b extending outwardly from the edge of the display region, such that the surfaces of the color layer segments 150a and the peripheral color layer segments 150b are flush with each other. In FIG. 3, which only shows a corner portion of the CF 150, the color layer segments 150a are arrayed in a stripe arrangement.

Figure 4:
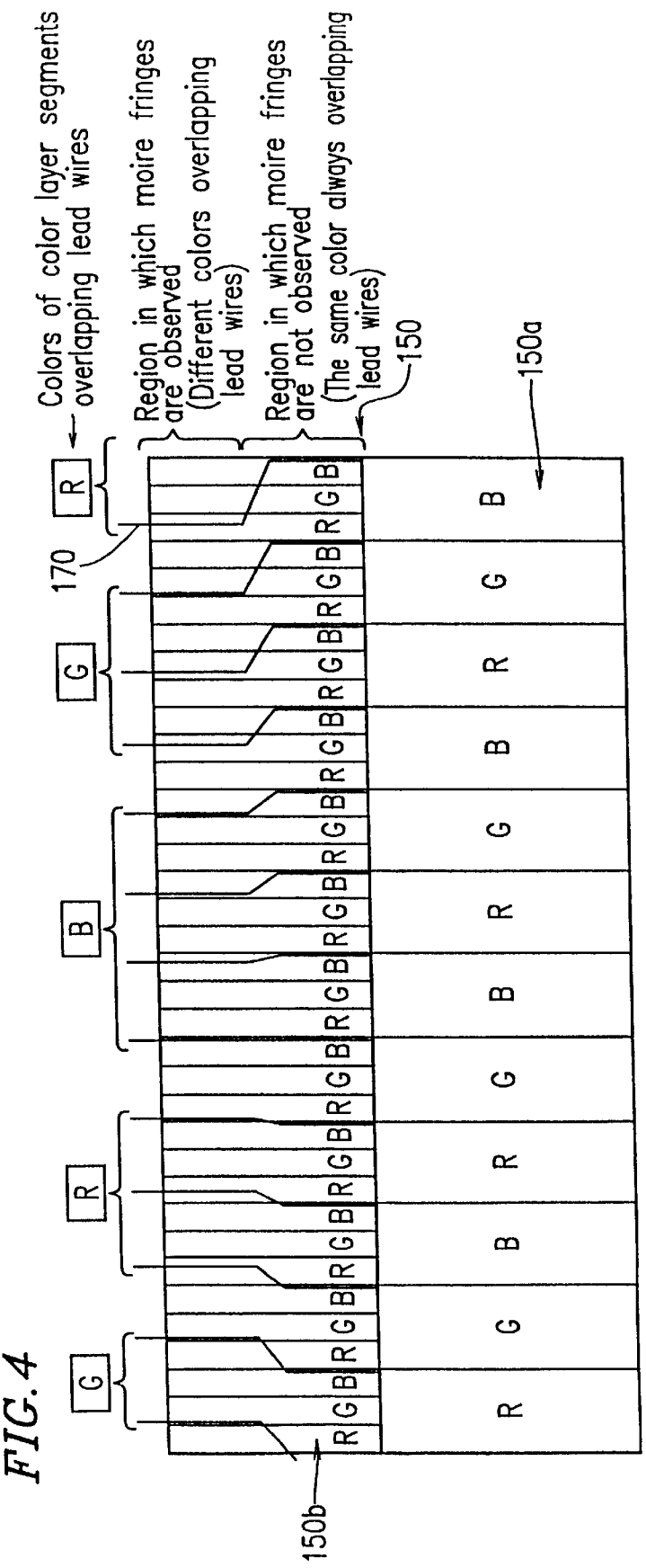
FIG. 4 is a plan view illustrating a main portion of an extensional section of signal lines in an LCD apparatus of the related art.

In accordance with the aforementioned CF substrate of the related art, the following problem may arise in the case where the pitch of the color layer segments 150a in the display region (with respect to pixels of one color) is set to be about 100 μm and the width of the stripe-like peripheral color layer segments 150b is set to be about 33.3 μm, so that the pitch of the peripheral color layer segments 150b with respect to the same color becomes equal to the width of a single pixel in the display region, as shown in FIG. 4.

A portion of each source signal line 170 that extends out of the display region of the related art, may be bent at two points within the peripheral region, so that two different pitches exist in a direction parallel to the pitch of the peripheral color layer segments 150b. That is, the source signal lines 170 have a greater pitch within the display region than in the portions after the two bends. As a result, strips-like moire fringes may be visually recognized in the region where the pitch of the color layer segments 150b is not equal to the source signal lines 170 (because the color of the overlapping color layer segment differs from lead wire to lead wire).

Figure 5:
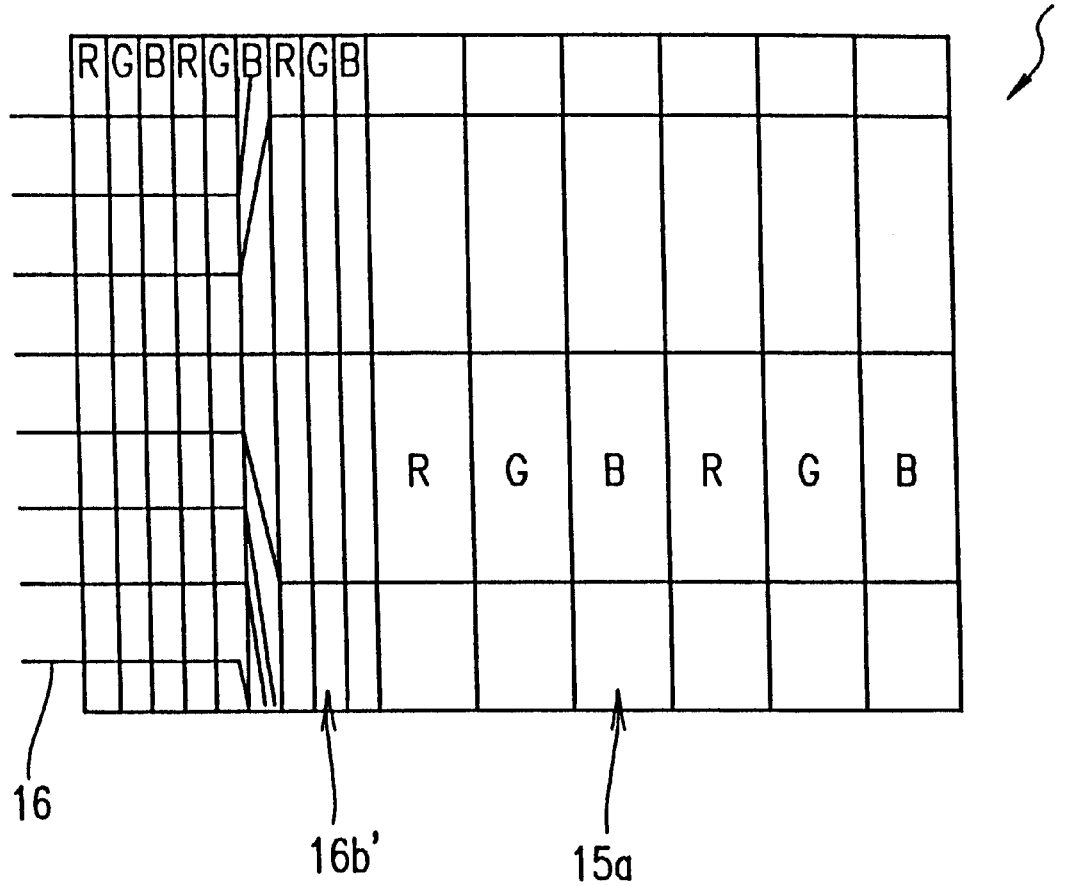
FIG. 5 is a plan view illustrating a main portion of an extensional section of scan lines in an LCD apparatus of the present invention.

On the contrary, in the extensional section of gate signal lines 16 according to the present invention as shown in FIG. 5, substantially no moire fringes are visually recognized since the pitch of the colors 16b' (i.e., R, G, and B in this case) overlapping the lead wires is about 100 μm or less and hence these colors are perceived as being blended together.

The perception of the colors as being blended together is because a normal person—that is, a person who has an eyesight (or corrected eyesight) of 1.0 according to the Japanese scale of eyesight—has a maximum perceivable resolution of about 100 μm. Thus, when the aforementioned pitch is about 150 μm or more, different colors can be readily recognized. When the aforementioned pitch is about 100 μm to 150 μm, the colors may or may not be separately recognized depending on the maximum perceivable resolution of each respective viewer. When the aforementioned pitch is about 100 μm or less, which is far below the normal maximum perceivable resolution, the colors are recognized as blended together and appear as a single color.

Therefore, according to the present invention, the CF substrate has a color layer arrangement such that color layer segments of the same color overlap at least a portion of the respective lead wires. Alternatively, the CF substrate may have a color layer arrangement such that the peripheral color layer segments have a pitch of about 150 μm or less, and preferably about 100 μm or less, along the wire length direction. These two arrangements may also be used in combination.

Hereinafter, detailed descriptions will be given with respect to specific embodiments of the present invention.

EXAMPLE 1

Figure 6:
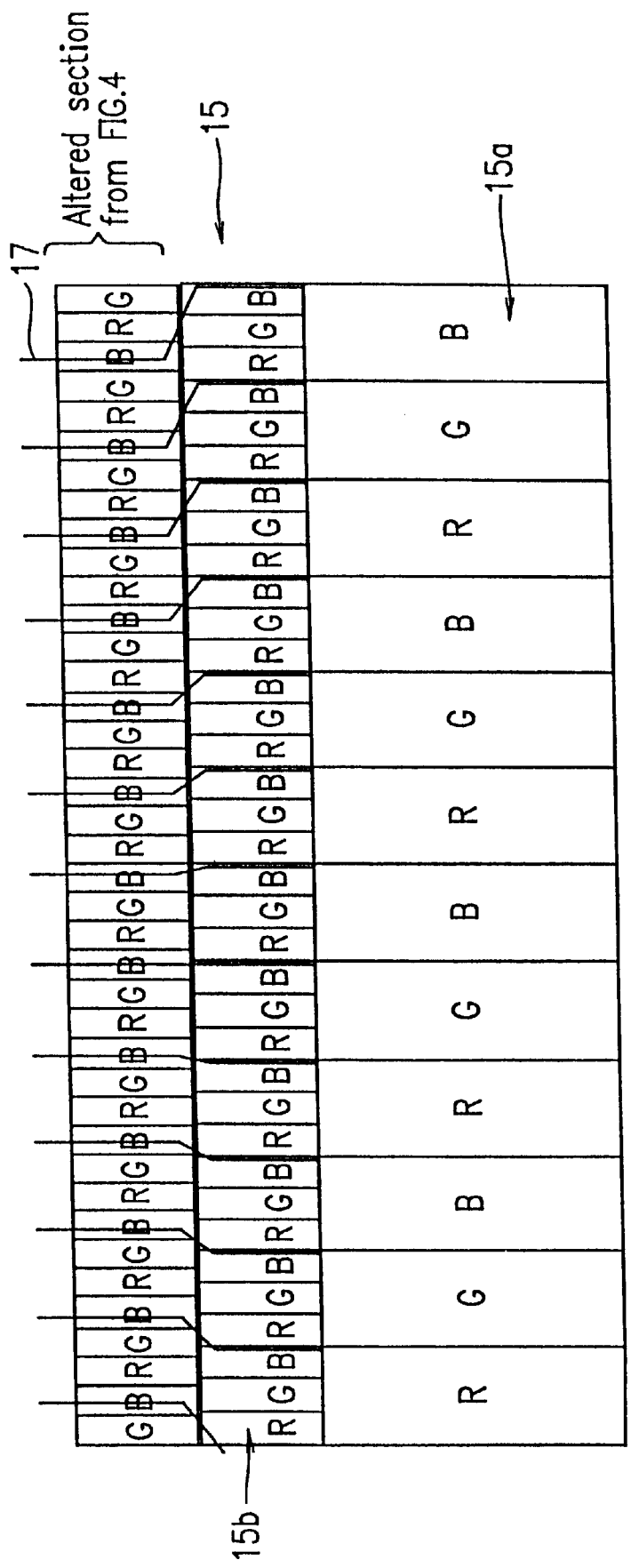
FIG. 6 is a plan view illustrating a main portion of the extensional section of signal lines in an LCD apparatus according to Example 1 or 3 of the present invention.

FIG. 6 is a plan view of an LCD according to Example 1 of the present invention, illustrating a main portion of an extensional section of the signal lines of a CF 15.

According to this example, stripe-like peripheral color layer segments 15b were arrayed in the same direction as that of the color layer segments 15a in the display region, similarly to the arrangement shown in FIG. 4. Additionally, the pitch of source signal lines 17 in the extensional section and the pitch of the peripheral color layer segments 15b were made equal, so that the color layer segment 15b overlapping any given source signal line 17 is always of the same color (i.e., B) within the region where moire fringes would have been observed in the arrangement of FIG. 4. Thus, the peripheral color layer segments 15b overlapping the parallel portions of the lead wires were always B, thereby preventing moire fringes from being recognized. This results in the LCD having improved display quality.

By employing a similar arrangement to that shown in FIG. 5 for the extensional section of the gate signal lines, no moire fringes would be recognized, and hence the display quality of the LCD is improved.

EXAMPLE 2

Figure 7:
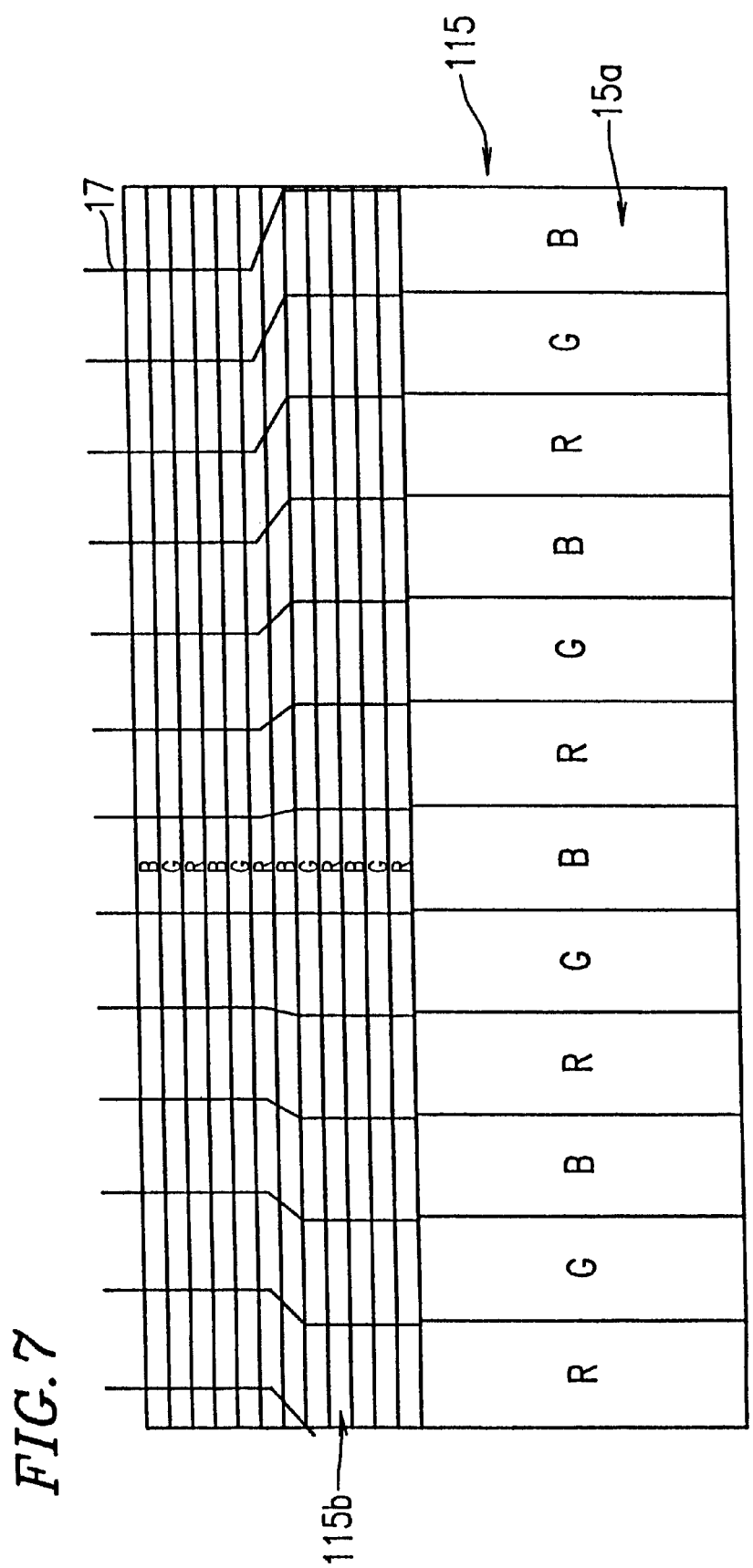
FIG. 7 is a plan view illustrating a main portion of an extensional section of signal lines in an LCD apparatus according to Example 2 or 3 of the present invention.
Figure 8:
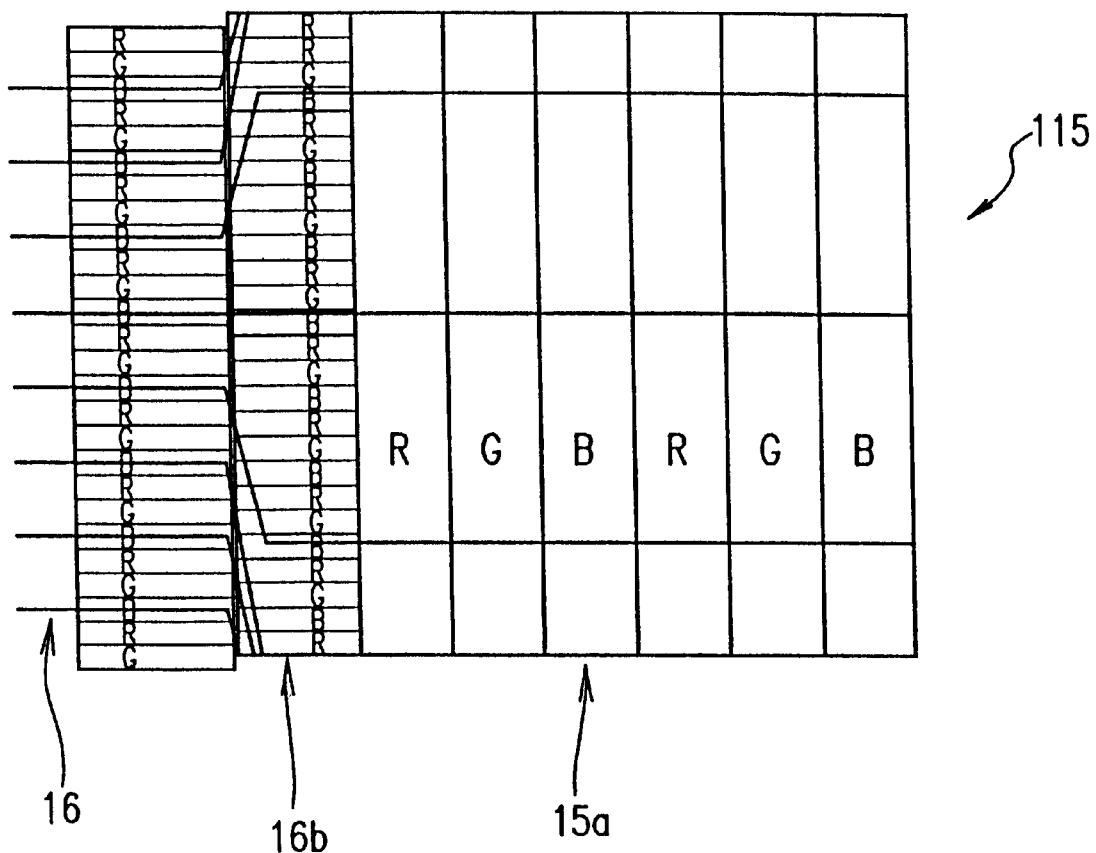
FIG. 8 is a plan view illustrating a main portion of an extensional section of scan lines in an LCD apparatus according to Example 2 or 3 of the present invention.

FIG. 7 is a plan view illustrating a main portion of the extensional section of source signal lines of a CF 115 according to Example 2 of the present invention. FIG. 8 is a plan view of a main portion of the extensional section of gate signal lines of the CF 115 according to Example 2 of the present invention.

In this example, stripe-like peripheral color layer segments 115b were arrayed along a direction perpendicular to the longitudinal direction of the color layer segments 115a in the display region.

In the extensional section of the source signal lines 17 as shown in FIG. 7, where the pitch of the peripheral color layer segments 115b overlapping the lead wires was set to be about 100 μm or less, the colors of the peripheral color layer segments 115b were perceived as being blended together, and this made it impossible to distinguish the color of the peripheral color layer segments 115b from the color of any portions that did not include overlapping lead wires.

In the extensional section of the gate signal lines 16 shown in FIG. 8, the peripheral color layer segments 16b overlapping the horizontal portions of the lead wires are always B, so that they do not to generate moire fringes in the manner of FIG. 4. Thus, the display quality of the LCD is improved.

Although all the stripes are illustrated to extend along the same direction over the entire peripheral region in the stripe arrangements according to Examples 1 and 2, the stripes of peripheral color layer segments may extend in different directions in different portions of the peripheral region.

EXAMPLE 3

In a CF for an LCD according to Example 3 of the present invention, the arrangements shown in FIGS. 5 and 7 were combined. Specifically, the stripe direction of the peripheral color layer segments was different in the extensional section of source signal lines 17 and in the extensional section of gate signal lines 16 so that the longitudinal direction of the color layer segments was perpendicular to that of the lead wires. Alternatively, the arrangements of FIGS. 6 and 8 were combined so that the longitudinal direction of the color layer segments was parallel to the direction of the lead wires.

With such arrangements, moire fringes became invisible, and thus the display quality of the LCD was improved.

Figure 9:
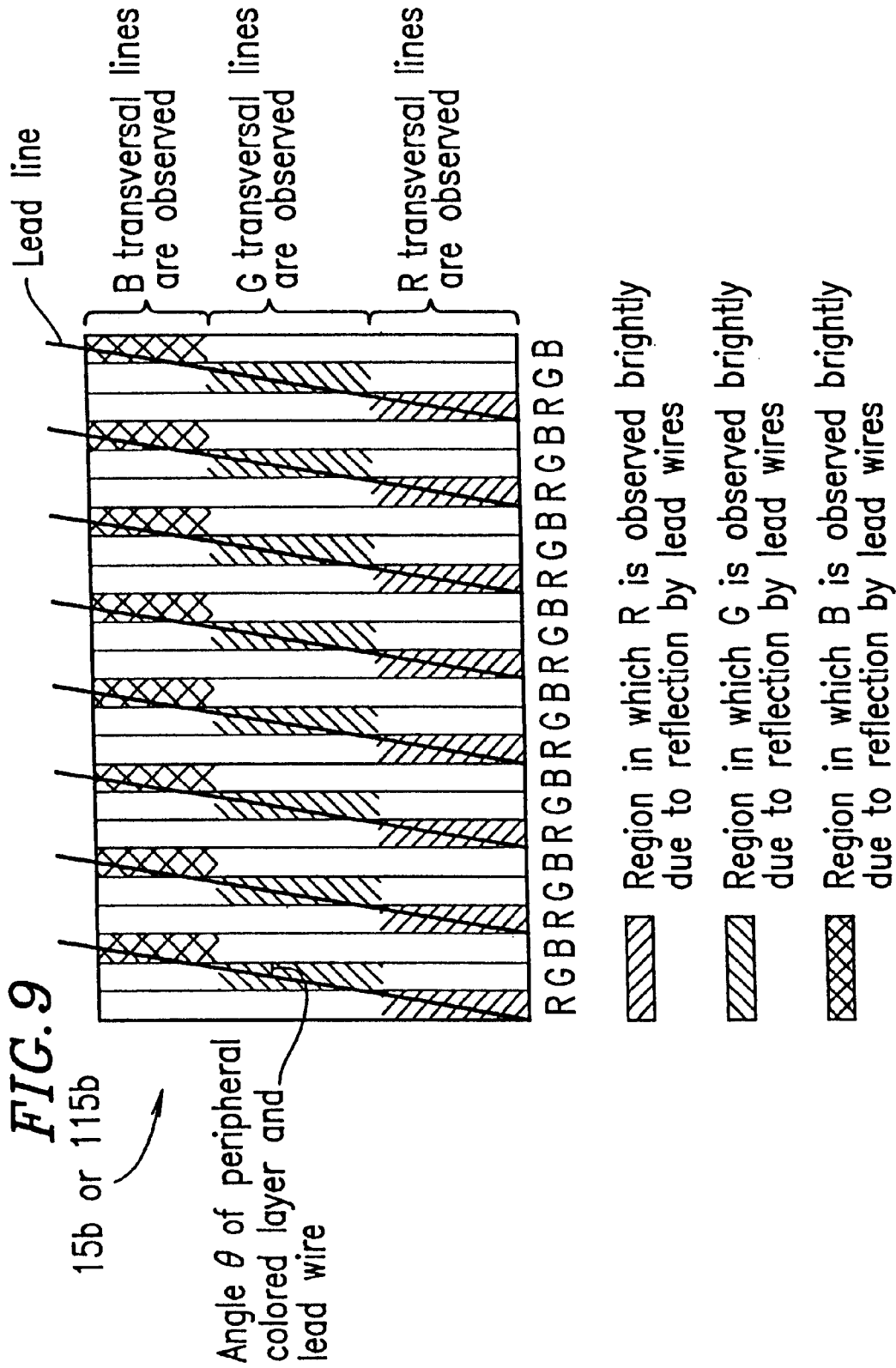
FIG. 9 is a plan view illustrating moire fringes recognized in a peripheral region in an LCD apparatus of the related art.

In Examples 1 and 2, there is a region in which the stripe-like peripheral color layer segments 15b and 16b overlap the extensional section of the signal lines 16 and 17 at an angle which is neither 90° nor 180°. As shown in FIG. 9, for example, moire fringes may be observed in a direction perpendicular to the lead wires, depending on the length of the lead wires; the crossing angle of the lead wires and the color layer segments 15b or 16b in the peripheral region; the pitch of the peripheral color layer segments 15b or 16b; or other conditions. Therefore, it is preferable to optimize these conditions.

Referring to FIG. 9, for example, the peripheral color layer segments of R, G, and B may be formed in a stripe arrangement with a stripe width of about 50 μm, and the angle θ between the lead wire direction on the AM substrate and the longitudinal direction of the stripe-like peripheral color layer segments on the CF substrate maybe set at about 45° or more, so that the pitch of the moire fringes observed in the direction parallel to the longitudinal direction of the peripheral color layer segments becomes about 150 μm or less, thereby preventing moire fringes from being recognized.

EXAMPLE 4

Figure 10:
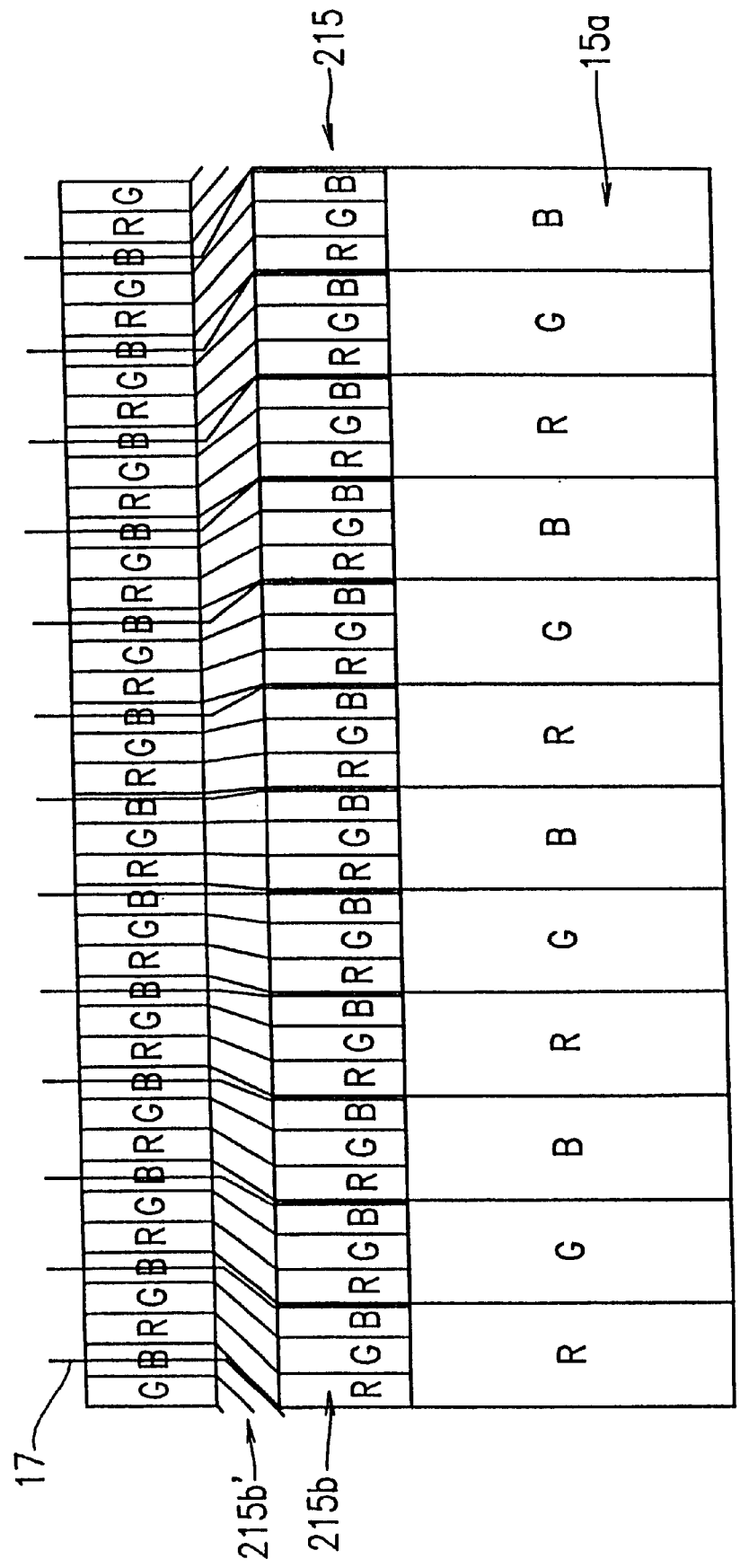
FIG. 10 is a plan view illustrating a main portion of an extensional section of signal lines in an LCD apparatus according to Example 4 of the present invention.

FIG. 10 shows a CF 215 for an LCD according to Example 4 of the present invention. In the arrangement is of FIG. 10, there is a region (215b') in which the stripe-like peripheral color layer segments 215b overlap the extensional section of the source signal lines 17 at an angle which is neither 90° nor 180°. As seen in FIG. 10, the longitudinal direction of each peripheral color layer segment 215b within the region 215b' is parallel to the respective lead wire.

With such an arrangement, moire fringes became invisible, and thus the display quality of the LCD was improved.

EXAMPLE 5

Figure 11:
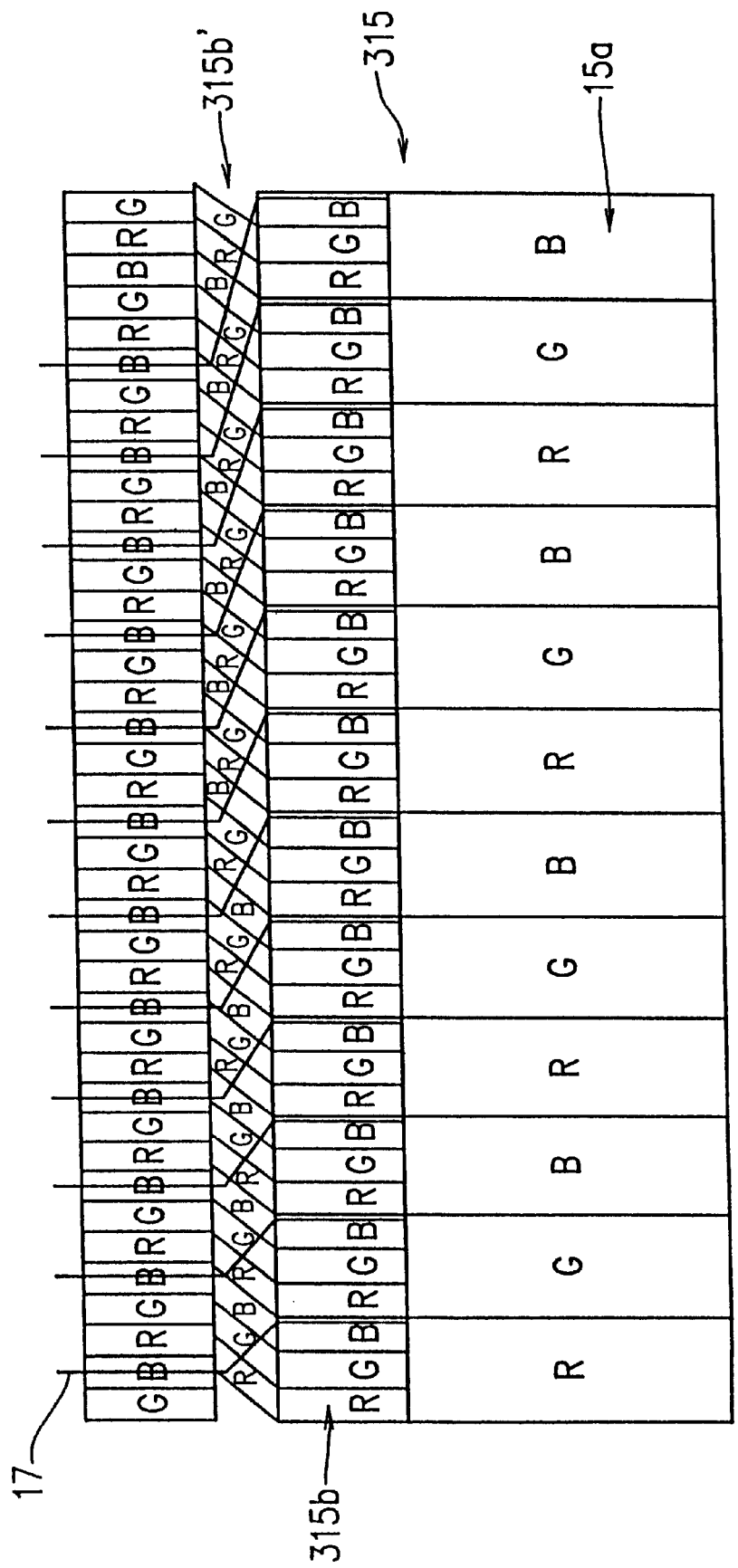
FIG. 11 is a plan view illustrating a main portion of an extensional section of signal lines in an LCD apparatus according to Example 5 of the present invention.

FIG. 11 shows a CF 315 in an LCD according to Example 5 of the present invention. In the arrangement of FIG. 11, there Is a region (315b') in which stripe-like peripheral color layer segments 315b overlap the extensional section of the source signal lines 17 at an angle which is neither 90° nor 180°. As seen in FIG. 11, the longitudinal direction of each peripheral color layer segment 315b within the region 315b' is perpendicular to the respective lead wire.

With such an arrangement, the moire fringes became invisible, and thus the display quality of the LCD was improved.

EXAMPLE 6

Figure 12:
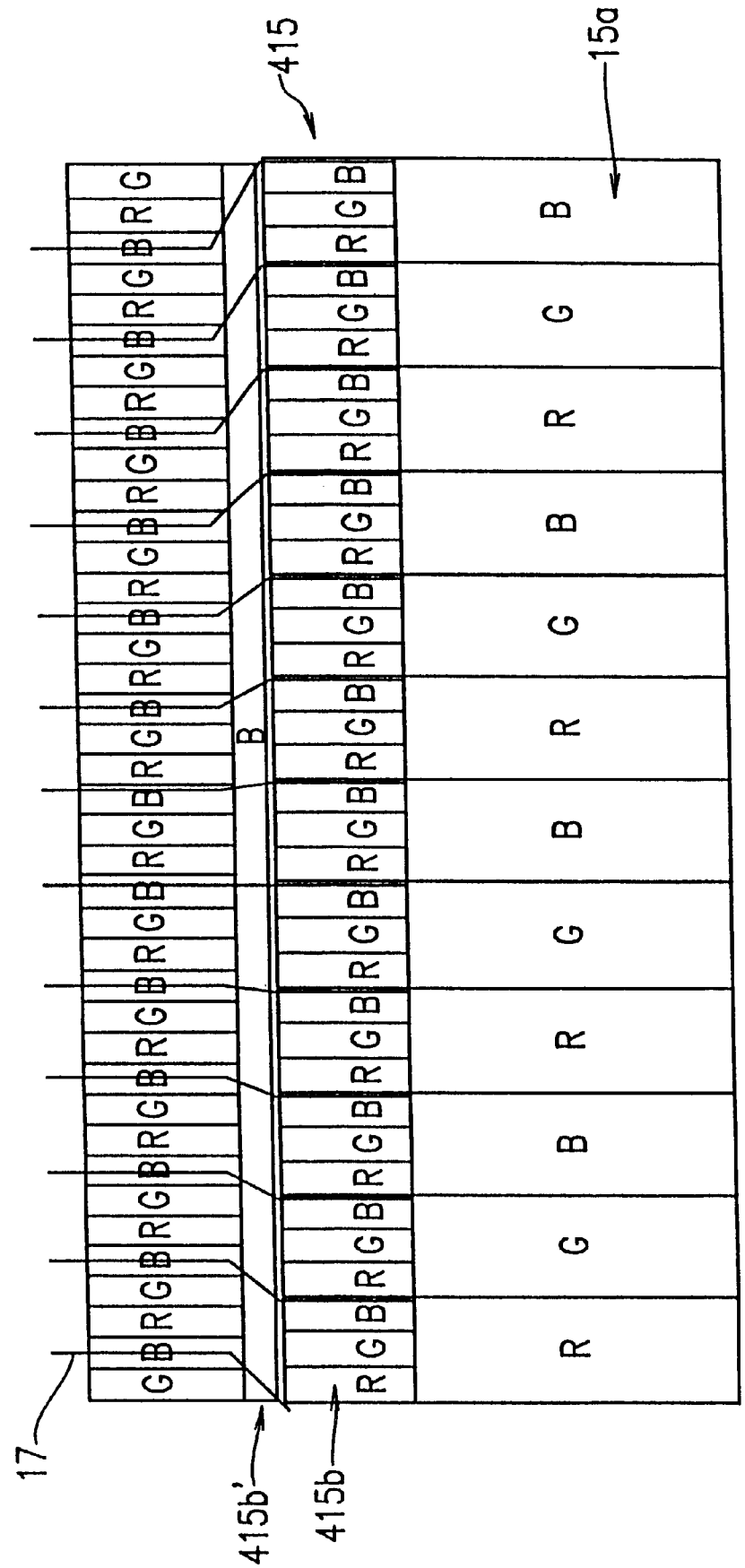
FIG. 12 is a plan view illustrating a main portion of an extensional section of signal lines in an LCD apparatus according to Example 6 of the present invention.

FIG. 12 shows a CF 415 in an LCD according to Example 6 of the present invention. In the arrangement of FIG. 12, there is a region (415b') in which stripe-like peripheral color layer segments 415b overlap the extensional section of the source signal lines 17 at an angle which is neither 90° nor 180°. As seen in FIG. 12, the width of the region 415b' along the wire length direction is about 1 mm or less. The region 415b' is filled with a color which has the least luminosity factor (e.g., B among R, G, and B) or a color which occupies the largest portion (in area ratio) of the peripheral region. In the present example, color layer segments of B were utilized to fill the region 415b'.

With such an arrangement, the moire fringes became invisible, and thus the display quality of the LCD was improved.

Each of the color layer segment arrangements described in Examples 4 to 6 can be adopted not only for the color layer segments corresponding to the source signal lines 17, but also for the color layer segments corresponding to the gate signal lines 16.

Figure 13:
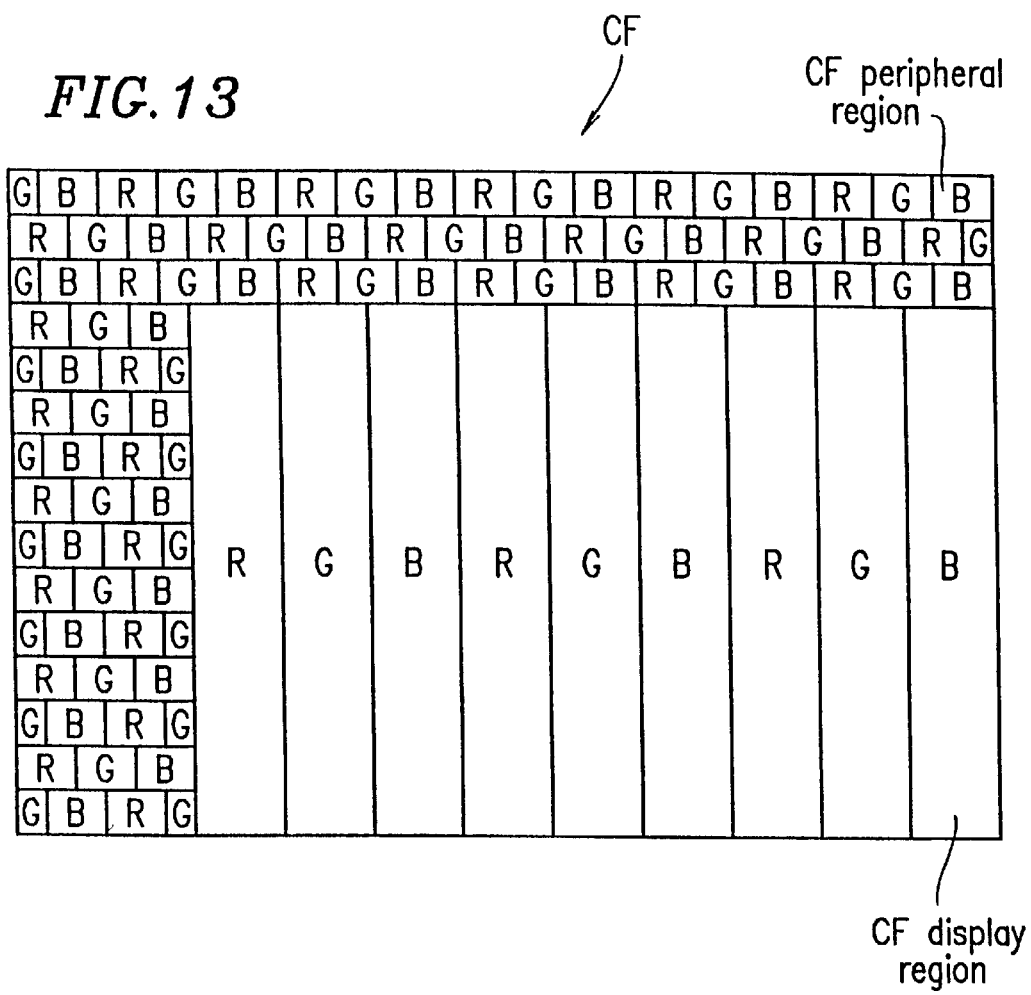
FIG. 13 is a plan view illustrating peripheral color layer segments arrayed in a delta arrangement.
Figure 14:
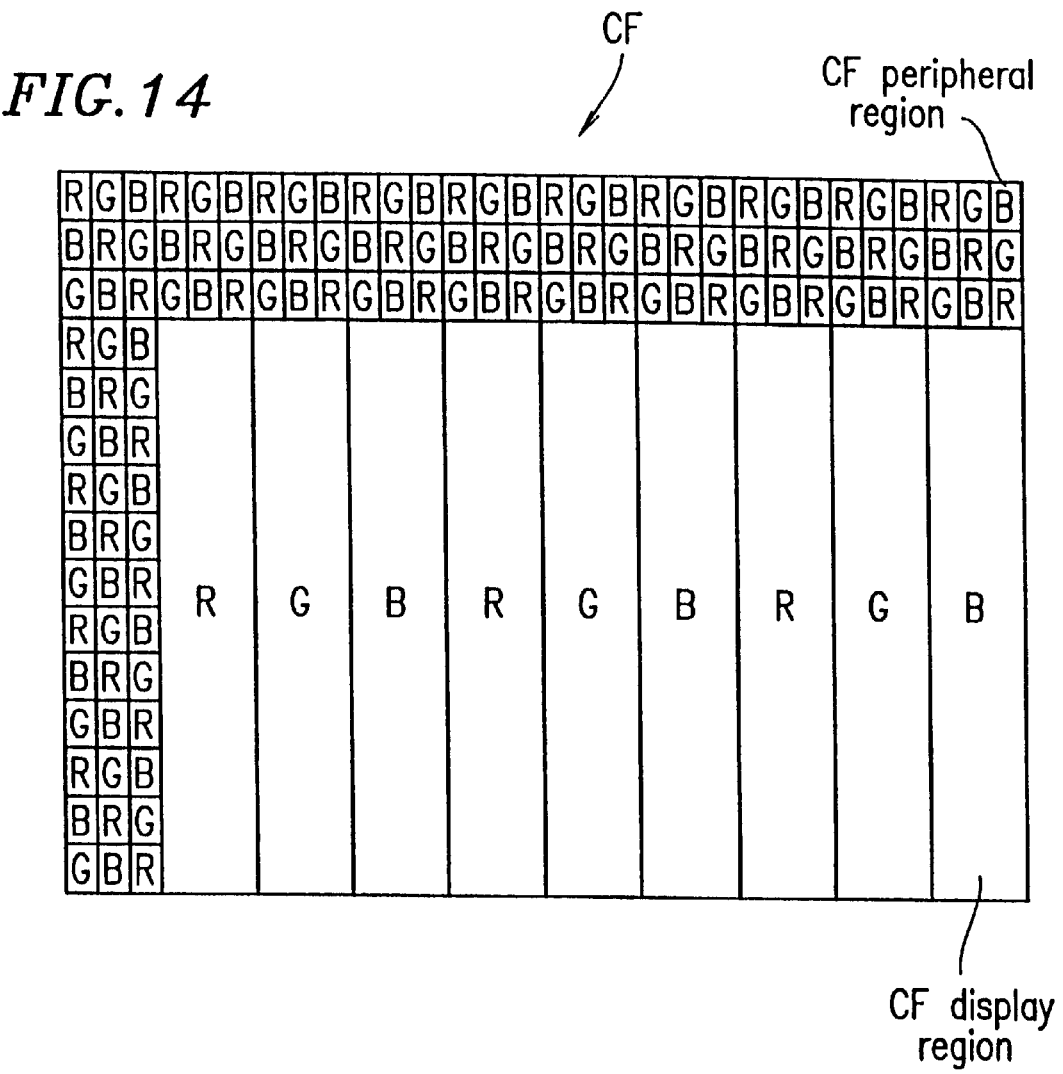
FIG. 14 is a plan view illustrating peripheral color layer segments arrayed in a mosaic arrangement.
Figure 15:
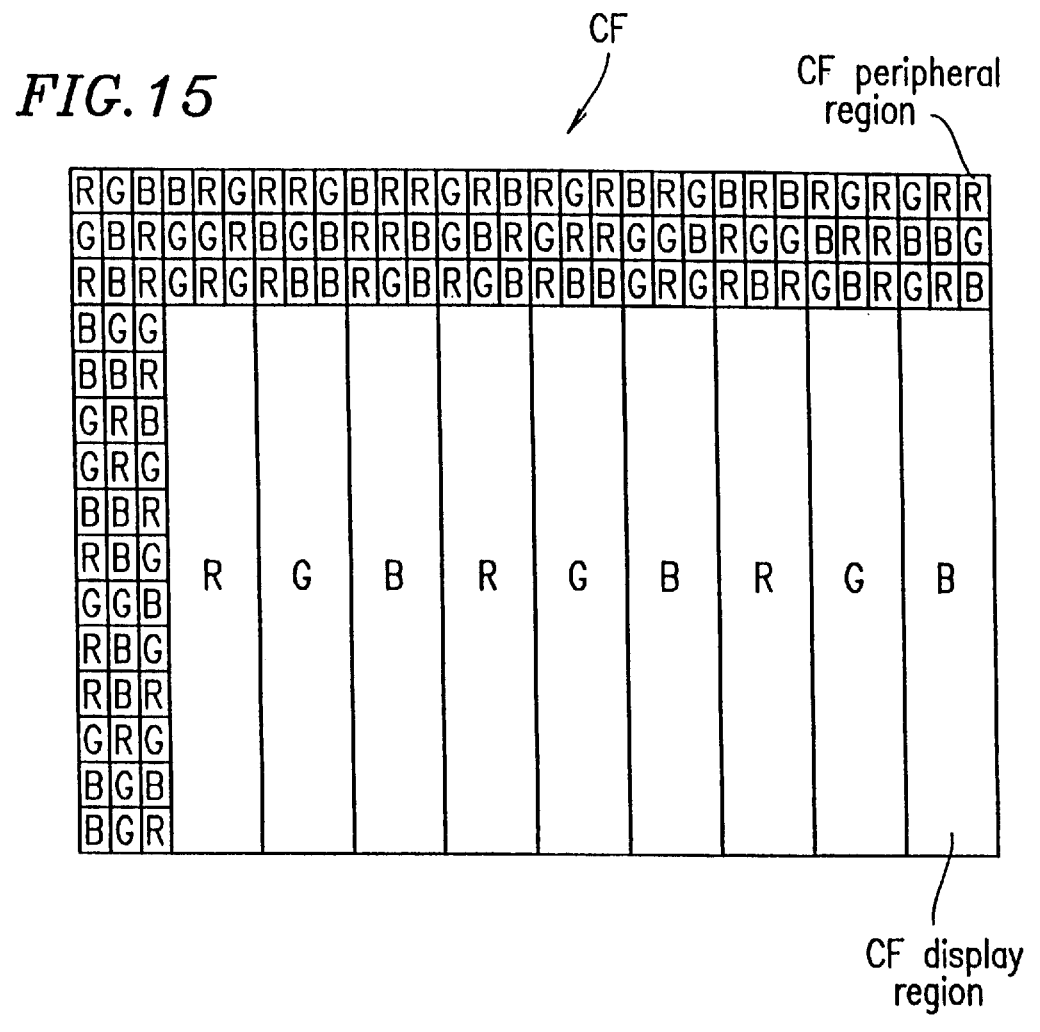

Although Examples 1 to 6 adopt R, G, and B for the colors of the display region, other primary colors may also be used, e.g., a set of magenta, cyan and yellow, or multiple primary colors consisting of more than three colors may also be used. For the peripheral color layer segments, at least two or more colors are used. In addition, the peripheral color layer segments may be arrayed with a predetermined area ratio and in a predetermined arrangement other than a strips arrangement, such as a delta, mosaic, or random arrangement illustrated in FIGS. 13 to 15, or a combination of these arrangements.

Such a CF can be fabricated using a variety of methods such as a dry film lamination method (DFL method), a dyeing method, a pigment dispersing method, a printing method, an electrodeposition method, an ink jet method, and the like.

In the above-described examples, a TFT color LCD apparatus has been described. However, the present invention is also applicable to any type of color display apparatuses using a CF, such as an EL (electro luminescence) color display apparatus, an STN (super twisted nematic) color display apparatus, a PDP (plasma display panel) color display apparatus, a CRT, etc.

As described above in detail, a CF substrate according to the present invention does not employ a black mask in the peripheral (frame) region. As a result, the number of steps during the production process is reduced, thereby reducing the manufacturing cost.

Furthermore, the CF substrate of the present invention has a color layer segment arrangement such that the color layer segments of the same color overlap at least a portion of the respective lead wires. Alternatively, the CF substrate may have a color layer arrangement such that the peripheral color layer segments have a pitch of about 150 μm or less, and preferably about 100 μm or less. A combination of these two arrangements may also be used. This can prevent moire fringes, which are conventionally generated when there is no predefined relationship between the arrangements or pitches of the lead wires on an AM substrate and the arrangements or pitches of the color layer segments on the CF substrate within the peripheral region. Thus, it is possible to improve the display quality of the display apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:
1. A liquid crystal display apparatus comprising:
a first substrate on which a plurality of signal lines and a plurality of scan lines are provided so as to appear to intersect each other at intersections;
a plurality of pixel electrodes each provided adjacent to a corresponding one of the intersections of the plurality of signal lines and the plurality of scan lines;
a second substrate having a first colored region comprising a plurality of colors, the first colored region corresponding to the plurality of pixel electrodes; and
a liquid crystal layer being interposed between the first substrate and the second substrate;
the apparatus further comprising a second colored region provided in at least a portion of a periphery of the first colored region, the second colored region comprising the plurality of colors, wherein:
at least one of the plurality of signal lines is bent within a region overlapping the second colored region;
the second colored region at least comprises a plurality of first color layer segments which are colored in a first color, and a plurality of second color layer segments which are colored in a second color; and
the plurality of first color layer segments are arranged so that a portion of the at least one signal line which overlaps the plurality of first color layer segments has a length greater than a length of a portion of the at least one signal line which overlaps the plurality of color layer segments other than the plurality of first color layer segments in the second colored region.

2. A liquid crystal display apparatus according to claim 1, further comprising a third colored region provided in at least a portion of the periphery of the first colored region, the third colored region comprising the plurality of colors, wherein:
   at least one of the plurality of scan lines is bent within a region overlapping the third colored region;
   the third colored region at least comprises a plurality of third color layer segments which are colored in a third color, and a plurality of fourth color layer segments which are colored in a fourth color; and
   the plurality of third color layer segments are arranged so that a portion of the at least one scan line which overlaps the plurality of third color layer segments has a length greater than a length of a portion of the at least one scan line which overlaps the plurality of color layer segments other than the plurality of third color layer segments in the third colored region.

3. A liquid crystal display apparatus according to claim 2, wherein the plurality of third color layer segments are colored in a color having the least luminosity factor among the plurality of colors.

4. A liquid crystal display apparatus according to claim 2, wherein the plurality of color layer segments comprised in the third colored region are arrayed in a stripe, delta, mosaic, or random arrangement, or in a combination thereof.

5. A liquid crystal display apparatus according to claim 2, wherein a sixth color layer segment is provided in at least a portion of the third colored region, the sixth color layer segment being colored in a color having the least luminosity factor among the plurality of colors, and the sixth color layer segment has a width of about 1 mm or less along a longitudinal direction of the plurality of the scan lines.

6. A liquid crystal display apparatus according to claim 2, wherein an eighth color layer segment is provided in at least a portion of the third colored region, the eighth color layer segment being colored in a color occupying a largest portion among the plurality of colors, and the eighth color layer segment has a width of about 1 mm or less along a longitudinal direction of the plurality of the scan lines.

7. A liquid crystal display apparatus according to claim 1, wherein the plurality of first color layer segments are colored in a color having the least luminosity factor among the plurality of colors.

8. A liquid crystal display apparatus according to claim 1, wherein the plurality of color layer segments comprised in the second colored region are arrayed in a stripe, delta, mosaic, or random arrangement, or in a combination thereof.

9. A liquid crystal display apparatus according to claim 1, wherein a fifth color layer segment is provided in at least a portion of the second colored region, the fifth color layer segment being colored in a color having the least luminosity factor among the plurality of colors, and the fifth color layer segment has a width of about 1 mm or less along a longitudinal direction of the plurality of the signal lines.

10. A liquid crystal display apparatus according to claim 1, wherein a seventh color layer segment is provided in at least a portion of the second colored region, the seventh color layer segment being colored in a color occupying a largest portion among the plurality of colors, and the seventh color layer segment has a width of about 1 mm or loss along a longitudinal direction of the plurality of the signal lines.

11. A liquid crystal display apparatus comprising:
   a first substrate on which a plurality of signal lines and a plurality of scan lines are provided so as to appear to intersect each other at intersections;
   a plurality of pixel electrodes each provided adjacent to a corresponding one of the intersections of the plurality of signal lines and the plurality of scan lines;
   a second substrate having a first colored region comprising a plurality of colors, the first colored region corresponding to the plurality of pixel electrodes; and
   a liquid crystal layer being interposed between the first substrate and the second substrate;
   the apparatus further comprising a second colored region provided in at least a portion of a periphery of the first colored region, the second colored region comprising the plurality of colors, wherein:
      at least one of the plurality of scan lines is bent within a region overlapping the second colored region;
      the second colored region at least comprises a plurality of first color layer segments which are colored in a first color, and a plurality of second color layer segments which are colored in a second color; and
      the plurality of first color layer segments are arranged so that a portion of the at least one scan line which overlaps the plurality of first color layer segments has a length greater than a length of a portion of the at least one scan line which overlaps the plurality of color layer segments other than the plurality of first color layer segments in the second colored region.

12. A liquid crystal display apparatus according to claim 11, wherein the plurality of first color layer segments are colored in a a color having the least luminosity factor among the plurality of colors.

13. A liquid crystal display apparatus according to claim 11, wherein the plurality of color layer segments comprised in the second colored region are arrayed in a stripe, delta, mosaic, or random arrangement, or in a combination thereof.

14. A liquid crystal display apparatus according to claim 11, wherein a third color layer segment is provided in at least a portion of the second colored region, the third color layer segment being colored in a color having the least luminosity factor among the plurality of colors, and the third color layer segment has a width of about 1 mm or less along a longitudinal direction of the plurality of the scan lines.

15. A liquid crystal display apparatus according to claim 11, wherein a fourth color layer segment is provided in at least a portion of the second colored region, the fourth color layer segment being colored in a color occupying a largest portion among the plurality of colors, and the fourth color layer segment has a width of about 1 mm or less along a longitudinal direction of the plurality of the scan lines.

16. A liquid crystal display apparatus comprising:
   a first substrate on which a plurality of signal lines and a plurality of scan lines are provided so as to appear to intersect each other at intersections;
   a plurality of pixel electrodes each provided adjacent to a corresponding one of the intersections of the plurality of signal lines and the plurality of scan lines;
   a second substrate having a first colored region comprising a plurality of colors, the first colored region corresponding to the plurality of pixel electrodes; and
   a liquid crystal layer being interposed between the first substrate and the second substrate;
   the apparatus further comprising a second colored region provided in at least a portion of a periphery of the first colored region, the second colored region comprising the plurality of colors, wherein:
      at least one of the plurality of signal lines is bent within a region overlapping the second colored region;
      the second colored region at least comprises a plurality of first color layer segments which are colored in a first color, and a plurality of second color layer segments which are colored in a second color; and the plurality of first and second color layer segments each have a width of about 150 µm or less along a longitudinal direction of the plurality of signal lines.

17. A liquid crystal display apparatus according to claim 16, further comprising a third colored region provided in at least a portion of the periphery of the first colored region, the third colored region comprising the plurality of colors, wherein:

at least one of the plurality of scan lines is bent within a region overlapping the third colored region;

the third colored region at least comprises a plurality of third color layer segments which are colored in a third color, and a plurality of fourth color layer segments which are colored in a fourth color; and the plurality of third and fourth color layer segments each have a width of about 150 µm or less along a longitudinal direction of the plurality of scan lines.

18. A liquid crystal display apparatus according to claim 17, wherein the plurality of third and fourth color layer segments each have a width of about 100 µm or less along a longitudinal direction of the plurality of scan lines.

19. A liquid crystal display apparatus according to claim 17, wherein the plurality of color layer segments comprised in the third colored region are arrayed in a stripe, delta, mosaic, or random arrangement, or in a combination thereof.

20. A liquid crystal display apparatus according to claim 16, wherein the plurality of first And second color layer segments each have a width of about 100 µm or loss along the longitudinal direction of the plurality of signal lines.

21. A liquid crystal display apparatus according to claim 16, wherein the plurality of color layer segments comprised in the second colored region are arrayed in a stripe, delta, mosaic, or random arrangement, or in a combination thereof.

22. A liquid crystal display apparatus comprising:

a first substrate on which a plurality of signal lines and a plurality of scan lines are provided so as to appear to intersect each other at intersections;

a plurality of pixel electrodes each provided adjacent to a corresponding one of the intersections of the plurality of signal lines and the plurality of scan lines;

a second substrate having a first colored region comprising a plurality of colors, the first colored region corresponding to the plurality of pixel electrodes; and a liquid crystal layer being interposed between the first substrate and the second substrate, the apparatus further comprising a second colored region provided in at least a portion of a periphery of the first colored region, the second colored region comprising the plurality of colors, wherein:

at least one of the plurality of scan lines is bent within a region overlapping the second colored region;

the second colored region at least comprises a plurality of first color layer segments which are colored in a first color, and a plurality of second color layer segments which are colored in a second color; and the plurality of first and second color layer segments each have a width of about 150 µm or less along a longitudinal direction of the plurality of scan lines.

23. A liquid crystal display apparatus according to claim 22, wherein the plurality of first and second color layer segments each have a width of about 100 µm or less along the longitudinal direction of the plurality of scan lines.

24. A liquid crystal display apparatus according to claim 22, wherein the plurality of color layer segments comprised in the second colored region are arrayed in a stripe, delta, mosaic, or random arrangement, or in a combination thereof.

* * * * *